INVENTORS
Hans Ernst
Albert H. Dall
BY
H. H. Parsons + L. W. Wright
ATTORNEYS

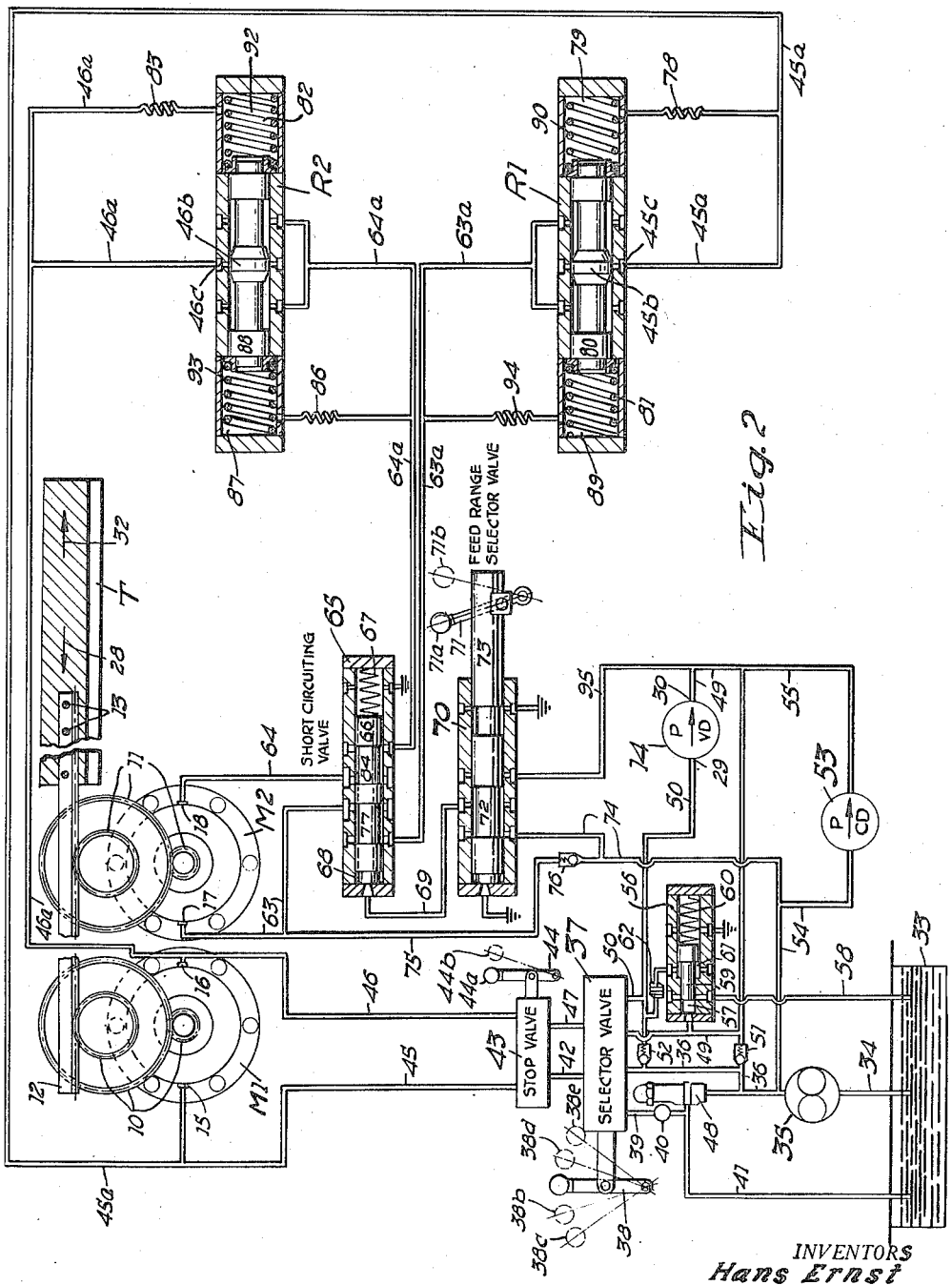

Patented Oct. 30, 1951

2,573,098

UNITED STATES PATENT OFFICE 2,573,098

HYDRAULIC FEEDING MECHANISM

Hans Ernst and Albert H. Dall, Cincinnati, Ohio, assignors to The Cincinnati Milling Machine Co., Cincinnati, Ohio, a corporation of Ohio Application September 26, 1946, Serial No. 699,424

16 Claims. (Cl. 90—21.5)

This invention pertains to hydraulic transmission and control mechanism for machine tools and is particularly related to hydraulic feeding mechanism for milling machines.

One of the objects of this invention is to provide an improved hydraulic feeding mechanism for a milling machine.

Another object is to provide an improved hydraulic feed actuating mechanism for a milling machine slide which is responsive and automatically compensative to neutralize tentative variations in the slide movement due to the cutting forces.

Still another object is to provide a hydraulic feeding system for a milling machine adapted to effect a smooth and uniform movement between work and tool regardless of variations in the cutting forces imposed on the system by the machining operation.

A still further object is to provide a dual hydraulic motor drive for actuating a machine tool member which is automatically responsive to fluctuating forces applied to said member to counteract said forces in their incipiency and therby maintain a uniform steady motion in said member.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Throughout the several views of the drawings similar reference characters are employed to denote the same or similar parts.

Figure 2 is a hydraulic circuit diagram showing the application of this invention to the actuation of a milling machine work table for either direction of feeding.

Figure 1:
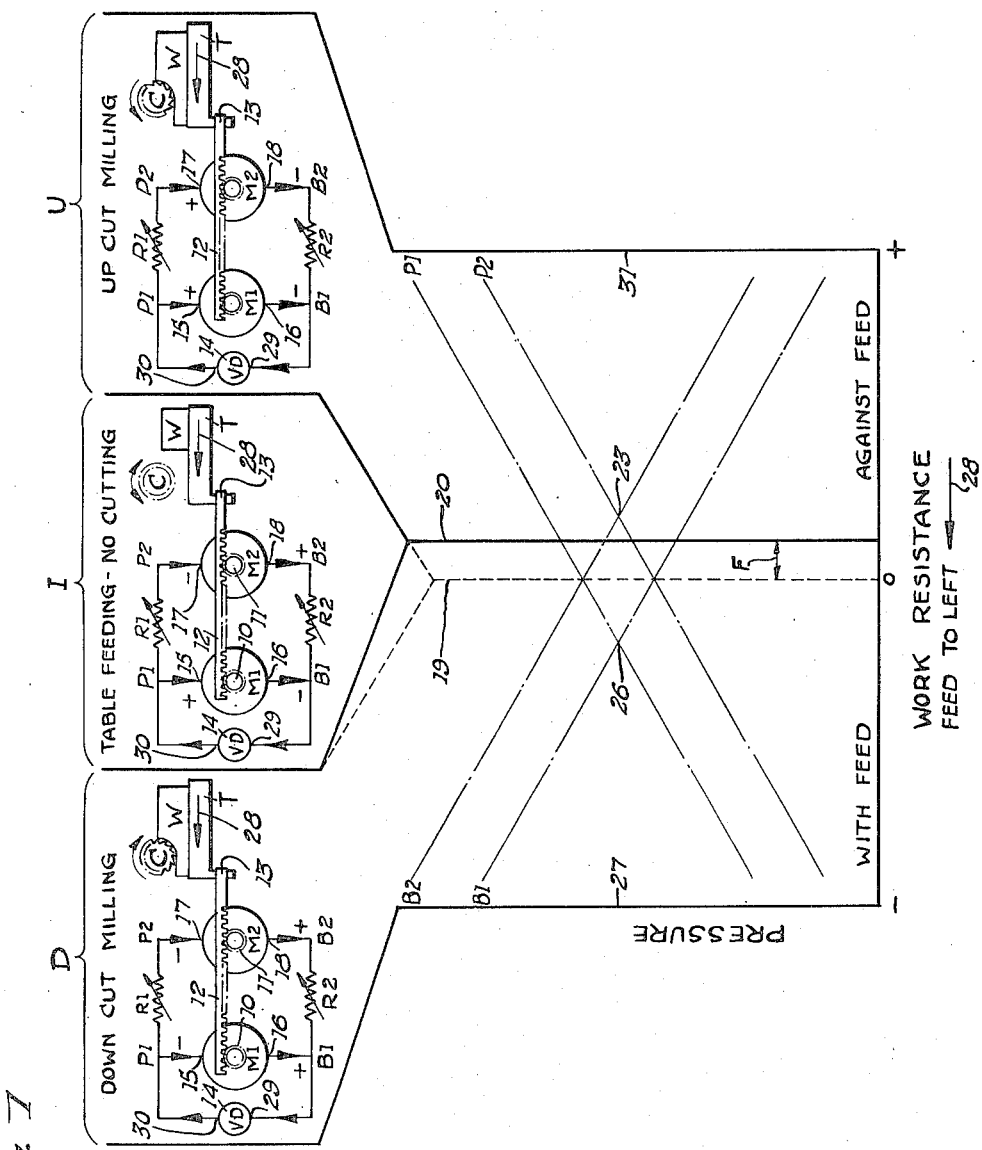
Figure 1 is an elementary diagram illustrating the basic principles of operation of this invention.

In machine tools there is usually provided one or more movable members which may be actuated by fluid pressure motive means and in which variable loads are encountered which cause changing resistances to the motion of these members. This penomenon is particularly present in a milling machine feeding mechanism because the work table is moved in relation to a rotary toothed cutter which inherently creates periodic forces. The intermittent cutting action of the cutter teeth on the work piece and the change in effective work resistance due to different amounts of stock to be removed at points in the cutting cycle or change in direction of rotation of the cutter with respect to the direction of feed result in wide variations in the forces and their direction of reaction on the feed transmission actuating the table. Such action must be counterbalanced to insure the smooth motion in the work table which is so desirable for the ultimate accuracy and high degree of finish required on the work piece.

This invention is particularly adapted to provide an actuating means for the work table which is sensitive and responsive to the fluctuating loads imposed by the reaction between cutter and work so as to automatically instantly oppose and prevent changes in the rate of movement of the work table during the cutting operation. In Figure 1 is shown in an elementary way the basic elements of this novel feeding mechanism and the various pressure conditions which may develop in the system under different cutting and idle operating conditions. The work table T is actuated and controlled in its movements by a pair of hydraulic motors M1 and M2. These motors may comprise any suitable type of hydraulic actuator but preferably are of the rotary motor type in order to minimize the volume of the hydraulic fluid necessary for their operation and thereby reduce the effect of the compressibility of the actuating fluid on the desired operation of the device. Each motor is connected to the work table T by any suitable mechanical drive means such as the transmission gears 10 and 11, Figures 1 and 2, which are coupled with a common rack 12 rigidly fixed to the work table by any suitable means 13.

A locked hydraulic circuit is preferably utilized for energizing these motors including a variable delivery pump 14 which, for example, supplies pressure to the intake port 15 of the hydraulic motor M1 and withdraws fluid from the exhaust port 16 of this motor for one direction of movement, or vice versa for the other direction of movement. The second hydraulic backlash or opposer motor M2 is connected in parallel with the motor M1 through a pair of automatically adjustable resistances R1 and R2 respectively associated with the ports 17 and 18 of the motor M2.

Assuming a condition of operation in which the table T is being fed to the left as indicated by the arrows 28 in Figure 1, and a hydraulic circuit hook-up as shown at I, U, and D in this figure, and a variable-delivery pump 14 of a positive displacement type provides fluid pressure from its outlet port 30 to the ports 15 and 17 of the motors M1 and M2 which act as intake ports of these motors. The ports 16 and 18 act as discharge ports of the respective motors M1 and M2 under these circumstances and connect to the intake port 29 of the pump 14. The pump 14 is adapted to positively transfer at all times a certain definite volume of fluid from its intake port 29 to its exhaust port 30 under one direction of feeding, as here illustrated when feeding in the direction 28. This positive fluid transfer is maintained independently of any pressure changes at the ports 29 and 30. Interconnected between the ports 15 and 17 of the motors M1 and M2 is an adjustable fluid resistance R1, and between the ports 16 and 18 of these respective motors is an adjustable fluid resistance R2, which are connected with the pump 14 in a locked or closed hydraulic circuit.

In this elementary system various operating conditions take place, depending upon whether the table T is being fed in idle condition with no engagement of cutter and work; whether a down-cutting or climb milling operation is taking place, or whether a conventional up-cut milling is being done.

Referring to the elementary circuit indicated at I in the central portion of the diagram, Figure 1, and assuming the table feeding to the left in the direction indicated by the arrow 28 and with the elementary circuit between the variable delivery pump 14 and the motors M1 and M2 arranged as described above, the only resistance to the normal direction of feeding motion at this time will be that of the friction in the feed transmission and the slideways between the table and its support in the machine. This frictional resistance is indicated in the diagram at F and represents the distance between the broken line 19, indicating no friction or work resistance, and the line 20. This frictional resistance F in effect acts as a positive work resistance during table movement, i. e., it represents a force which opposes the direction of feeding movement of the work table when being fed in idle movement with no engagement of work and cutter. This positive frictional resistance must be overcome by the driving action of the motor M1 to effect idle movement of the table.

In addition, in order to provide smooth non-jumping operation of the work table under idle feeding movements, there is also maintained a somewhat smaller opposing force against the action of the motor M1 acting in effect as a positive work resistance opposing the direction of feeding movement during the idle feeding movement. This is provided by the second motor M2 which is connected in the elementary circuit as above explained through the adjustable resistances R1 and R2 which are automatically regulated so that at the time of idle feeding, the motor M2 opposes the driving rotation of the motor M1 through the rack 12 by maintaining a somewhat higher fluid pressure B2 at its discharge port 18 than at its intake port 17. Thus, the motor M2 under the idle operating conditions, tends to hold back and oppose the normal driving action of the motor M1 so that the motor M1 during idle feeding must overcome both the frictional force F and the opposing force of the motor M2.

The maintenance of this opposition by the motor M2 under idling conditions is particularly significant in down-cut milling operations so that as the work approaches the cutter in idle feeding movement and initially engages the cutter there will already be established an opposing effect instantly responsive to the hooking in or negative work resistance which results during down-cut milling and to thereby arrest and instantly neutralize the irregular motion which might otherwise result in the work table at the incipient stage of cutter engagement.

Considering the conditions where the down-cut milling operation is begun and continued, and referring to the elementary diagram illustrating this operating condition at D in Figure 1, as the work table feeds along, for example, in the direction 28 with the same elementary circuit arrangement as set forth above, the cutter C begins to engage the work piece W and tends to pull the work piece along in the direction of the feeding motion so as to assist or accelerate the normal feeding motion. As this takes place, the negative work resistance at first may build up to a point sufficient to equal the positive frictional force of the feed transmission and work table so that the two motors M1 and M2 ultimately have their pressures changed to the condition as shown by the broken line 19 in Figure 1. At this point the negative work resistance and the positive frictional resistance balance each other and both of the motors have their pressures changed so that the pressure at the inlet port 15 of the motor M1 equals the discharge pressure at the outlet port 18 of the motor M2, and the pressure at the inlet port 17 of the motor M2 is equal to the pressure at the discharge port 16 of the motor M1 so that these motors are balanced. This theoretical condition may temporarily exist where both motors exactly balance each other and wherein no effort is required to effect the feeding movement.

As the conditions indicated at line 19, Figure 1, are passed, the motor M2 now becomes a dominant motor to oppose negative work resistance during downcut milling as the motor M1 decreases its effective force exerted in the direction of feeding. This can be clearly seen on the diagram, and is indicated at 26 which is the changeover point for the motor M1 from applying a force in the direction of feeding to acting as an opposing member to the negative work resistance being developed by the down-cut milling operation. Thus, after the point 26 is reached and passed, both of the motors M1 and M2 act as opposing devices, i. e., they oppose the feeding motion being effected by the down-cut milling operation, the motor M2 being the dominant opposing device at this time.

It is to be noted that during the down-cut milling action the pressures at the various ports of the motors M1 and M2 are indicated on the diagram, Figure 1, between the lines 20 and 27. During relatively light down-cut milling, the motor M1 at all times acts in the direction of feed, though at a lesser value than the opposing action of the motor M2, so as to positively control the table movement against undesirable jumping motion. It is to be further noted that upon increasing the down-cut milling action to heavy cutting conditions, both motors will then automatically become opposing devices to properly maintain smooth movement of the work table in the feeding direction 28.

In up-cut milling, the various pressure changes which take place with respect to the motors M1 and M2 are illustrated in the diagram, Figure 1, between the lines 20 and 31. The same circuit arrangement is indicated at U in the elementary diagram, Figure 1, as utilized at I and D described above. As the up-cut milling operation progresses, pressure builds up at the intake port 15 of the motor M1 and decreases at the discharge port 16 of this motor. During relatively light up-cut milling the motor M2 is automatically regulated by the interconnected resistances R1 and R2 connected to the motor M1 as described so that the pressure at the discharge port 18 of the motor M2 is somewhat higher than the pressure at the intake port 17 of this motor M2. Thus, there is maintained a small opposing pressure by the motor M2 in addition to the friction force F which must be overcome by the motor M1 during light up-cut milling operations. This opposition by the motor M2 under light up-cut milling operations is desirable to maintain rigid control of the work table and prevent any jumping action due to the light cutting forces and to the variation in friction of the transmission and slideways for the table.

As soon as excessively heavy cutting begins to take place in the up-cut milling operation, however, both motors automatically become effective to drive the work table in the direction of feeding movement. This is accomplished by the automatic regulation of the resistances R1 and R2 so that when the point 23 is reached the motor M2 changes over from an opposing device to a device to assist the motor M1 in driving the work table in feeding direction. It is to be noted that the motor M2 increases its assistance to the motor M1 as the positive work resistance during up-cut milling increases. It will be noted that under these latter circumstances after the point 23 has been reached and passed that the motor M1 maintains the dominant driving action assisted to a lesser degree by the motor M2 during the normal up-cut feeding operations. Under these latter conditions the pressures P1 and P2 at the respective intake ports 15 and 17 of the motors M1 and M2 are maintained in excess of their respective output pressures B1 and B2 at the respective discharge ports 16 and 18 of these motors under the above-recited conditions of operation.

Summarizing the above operating conditions: when the work table is being fed in idle motion with no cutting action taking place between work and tool, the motor M1 provides a dominant motive force for effecting the feed movement which is opposed simultaneously by the friction forces of the feed transmission and work table slide and by a small opposing force applied by the motor M2. As a negative work resistance develops during down-cut milling the motor M2 automatically increases its opposition to the negative work resistance while the motor M1 automatically decreases its forward feeding force. This action continues until the negative work resistance of the down-cut milling increases until the motor M1 automatically changes over to assist the motor M2 in opposing the movement of the work table in the feed direction.

During up-cut milling, as the table passes from an idle feeding condition to an active cutting condition, the motor M1 increases its effective force to move the table in feeding direction while the motor M2 decreases its opposing action until a point is reached, upon increase of the positive work resistance, where the motor M2 automatically becomes an actuator to assist the motor M1 in moving the work table in feeding direction.

It is to be noted that under all conditions of idle feeding and relatively light down-cut or up-cut milling, both motors are arranged to oppose each other while maintaining the direction of feeding movement so as to render the system instantly responsive to rapidly varying forces incited by the cutting action of work and tool which tend to change the desired smooth operating movement of the work table. This arrangement automatically eliminates the backlash in the mechanical interconnecting transmissions between the motors and the work table and thereby eliminates all chatter and vibration which might otherwise develop therein during the cutting operation. Also, this system provides an arrangement whereby the motors are instantly sensitive to and adapted to immediately neutralize any variations in the table movement during the cutting operation. Any changes in the forces applied between work and tool and rapid changes from both up-cut and down-cut milling to idle feeding motion may rapidly take place with the motors M1 and M2 instantly responsive to such changes.

In the elementary description of this invention, as illustrated in Figure 1, there has been shown the instance of feeding in one direction 28 only. This invention is well adapted, however, to feeding in both directions and reference is had to the exemplary circuit shown in Figure 2. In this arrangement feeding motion may readily take place not only in the direction 28 but also in the opposite direction 32 so that both down-cut and up-cut milling may be readily undertaken in either of these directions.

In this embodiment operating fluid is derived from a fluid reservoir 33 through the suction line 34 connected to the intake of the gear pump or rapid traverse pump 35 which discharges fluid under pressure to the pressure line 36. This line is connected to a selector valve 37 for controlling the feed and rapid traverse movements of the work table T in either direction. The selector valve 37 has a suitable control lever 38 operable to a feed left position 38b, and a rapid traverse left position 38c, and also operable to a feed right position 38d, and a rapid traverse right position 38e. A stop valve 43 having a control lever 44 movable to a run position 44a and a stop position 44b is provided to arrest movement of the work table. When the table is stopped, fluid pressure from the line 36 is connected through the selector valve 37 to a line 39 which is connected to low pressure relief valve 40, which discharges into the drain line 41 for return of fluid to the reservoir 33. Under these conditions the rapid traverse pump 35 is thus circulating fluid under relatively low pressure through the low pressure relief valve 40.

When the control lever 38 is moved to the rapid traverse left position 38c fluid pressure from the line 36 is then connected through the selector valve to the line 42 connected to the stop valve 43. When the control lever 44 of the stop valve is in the run position 44a fluid from the line 42 will be delivered to the line 45 which is connected to the port 15 of the motor M1. Return fluid from the port 16 of the motor M1 passes through the line 46, the stop valve 43, the line 47, selector valve 37, into the line 39 connected to the low pressure relief valve 40 and then into the drain line 41 for return of fluid to the reservoir 33. It is to be noted that at this time fluid pressure in the line 36 is not connected to the line 39 and the low pressure relief valve 40 but is confined in the line 36 to which is connected a higher pressure relief valve 48 which exhausts into the drain line 41. This higher pressure relief valve establishes a greater pressure in the line 36 for proper operation of the motor M1 at rapid traverse movements.

When the control lever 38 of the selector valve 37 is moved to the rapid traverse right position 38e pressure from the line 36 will then be connected through the selector valve 37 to the line 47 and then through the stop valve 43 to the line 46 connected to the port 16 of the motor M1. Return fluid from the port 15 of the motor M1 will pass out through the line 45, stop valve 43, line 42, and the selector valve 37 to the line 39 and then through the low pressure relief valve 40 to the drain line 41. The stop valve 43 may be operated by positioning this lever 44 in the stop position 44b to thereby simultaneously close off both of the lines 45 and 46 of the motor M1 to prevent its rotation and stop movement of the work table T.

Feeding motion of the work table T is effected by means of a locked hydraulic feeding circuit operating in conjunction with motor M1 which comprises a variable delivery high pressure feeding pump 14 having a pressure delivery port 30 connected to the main feed pressure line 49 which is connected to the selector valve 37. The return line 50 from the selector valve 37 is connected to the intake port 29 of the variable delivery pump 14. Both of the lines 49 and 50 are supplied initially with fluid from the rapid traverse pump pressure line 36 through the respective check valves 51 and 52. The feed pressure line 49 is maintained properly charged with fluid at all times by means of the high pressure booster pump 53 which is supplied with fluid from the branch line 54 of the pressure line 36 from the rapid traverse pump 35 and transmits the fluid under high pressure through the line 55 into the pressure line 49 of the circuit associated with the variable delivery pump 14.

When the control lever 38 of the selector valve 37 is moved to a feed left position 38b high pressure fluid from the line 49 is connected through the line 42, stop valve 43, to the line 45 connected to the port 15 of the motor M. Discharge from the port 16 of the motor M1 at this time passes through the line 46, stop valve 43, and the line 47 to the selector valve 37 where it is then connected to the intake line 50 of the variable delivery pump 14 so as to provide a locked or closed hydraulic feeding circuit between the variable delivery pump 14 and the motor M1.

A conventional differential relief valve 56 is employed which permits a complementary rise and fall in both forward and back pressure in the lines 45 and 46 for either direction of feeding so that the sum of the forward and back pressures in these lines must remain constant for any pressure difference which may exist between them. This valve has a pressure chamber 57 suitably connected to the line 49. Fluid may escape from the chamber 57 into the drain line 58 past the end of a spring-urged plunger 59 which is moved by a compression spring 60 in opposition to the pressure in chamber 57. A fluid pressure chamber 61 also acting in opposition to the spring 60 is connected through a resistance 62 to the return line 50 of the variable delivery pump 14. Pressure changes in both of the lines 49 and 50 reacting against the spring 60 effects the complementary pressure rise and fall in the supply lines 45 and 46 for the motor M1 in accordance with the arrangement shown in Patent No. 2,019,486, issued November 5, 1935, to which reference may be had for a further detailed description of the operation of the differential relief valve.

In order to best understand the operation of the motor M2 in conjunction with the motor M1 in providing backlash vibration dampening action for the table T a typical operating cycle will be described. Assuming a work piece W to be properly mounted on the work table T, and the stop valve in a running position, the operator moves the control lever 38 to a rapid traverse left position for rapid movement of the table in a direction 28 to bring the work initially into cutting position with the tool. As described in connection with Figure 1, both of the motors M1 and M2 are mechanically connected to the common rack so that rapid movement of the table by the rapid rotation of the motor M1 would cause rapid rotation of motor M2.

In order to effect rapid traverse movement without hindrance from the motor M2, means are provided for automatically cutting out or short circuiting the fluid circulation by this motor in the lines 63 and 64 through resistances R1 and R2 interconnected between the ports 17 and 18 of the motor M2. This is accomplished by means of a short circuit valve 65 having a plunger 66 mounted for axial movement in the valve 65 and held in one direction by means of a compression spring 67 and adapted to be moved in the opposite direction by means of pressure applied in pressure chamber 68 provided in the valve behind the plunger 66. The pressure chamber 68 is connected by a suitable line 69 to the feed range selector valve 70, having a control lever 71 movable to a low position 71a and to a high position 71b. When the control lever 71 is in the low position 71a, the line 69 is connected through the annular groove 72 formed in the valve plunger 73 of the valve 70 to the line 74 connected to the line 54 which, in turn, is connected to the supply line 36 from the rapid traverse pump 35. A branch line 75 supplied through a check valve 76 from the line 74 serves to supply fluid from the rapid traverse pump 35 to the line 63 to at all times keep the circuit associated with the motor M2 charged with fluid.

When the control lever of selector valve 37 is moved to the position 38c for rapid traversing movement to the left the pressure in the gear pump line 36 rises as above described since now the higher pressure relief valve 48 is operative while the lower pressure relief valve 40 is disconnected from this line by the selector valve. The rise in pressure in line 36 causes a similar rise in pressure in the lines 54, 74, and 69 and likewise in the pressure chamber 68 of the short circuiting valve 65 so as to axially move its plunger 66 to overcome the spring 67 to interconnect the lines 63 and 64 through the annular groove 77. Thus rotation of the motor M2 at rapid traverse rates is readily permitted since fluid may freely circulate through the motor M2, the line 63, annular groove 77, and the line 64. This condition, of course, obtains as well when the control lever 38 of the selector valve is moved to rapid traverse right position 38e in which the fluid circulation by the motor M2 through the valve 65 would take place in the opposite direction.

Having thus positioned the work and table in initial cutting position, the selector valve is now moved to a feed left position 38b which automatically reconnects the rapid traverse pump 35 through the low pressure relief valve 40 thus reducing the pressure in the lines 54, 74, and 69 to cause the pressure to drop in the chamber 68 of the short circuiting valve to permit its spring 67 to axially shift the plunger to the position shown in Figure 2. Feeding motion of the table T takes place with high pressure from the line 49 delivered through line 45 to the port 15 of the motor M1 and exhausted out through the port 16 back through 46, 47, 50, to the intake port 29 of the pump 14 as described. Pressure built up in the line 45 is transmitted through a line 45a connected through a resistance 78 into a pressure chamber 79 of the valve R—1 causing pressure to build up behind the plunger 80 to move it against the compression spring 81 and thus move the double tapered throttle spool 45b to connect line 45a to line 63a. The extent of movement of the valve spool 45b will determine the pressure drop in line 63a with respect to the pressure line 45a.

The pressure in line 63a will be communicated through resistance 94 to chamber 89 to exert, in conjunction with the spring 81, a counterbalancing force against the pressure in chamber 79. It will be apparent that the spring 81 will determine the amount of the pressure drop. The motors M1 and M2 are geared together in such a way that they both displace the same volume of fluid as the table travels in feeding movement, so that the amount of fluid passing through one motor will be equal to the volume of fluid passing through the other.

The fluid discharged from motor M2 will pass into line 64a and when the pressure in that line has risen sufficiently it will react in chamber 87 and cause shifting of plunger 88 and its double tapered valve spool 46b to open port 46c. The pressure necessary to open this port is determined by spring 82 and must obviously be higher than the pressure in line 46a or in other words the discharge pressure from the first motor. In this way, the pressure drop across the second motor is maintained less than the pressure drop across the first motor during up-cut milling operation.

When the table is moving in direction 32 with the forward pressure of the pump acting through 45 to motor M1 and through resistance valve 80 to 63a—63 and motor M2, the back pressure of motor M2 is communicated through 64—64a to the pump back pressure 46a—46 through throttle valve 88. For any given feed rate throttle valves 80 and 88 will have established a position to give a constant pressure drop from lines 45a to 63a and from lines 46a to 64a respectively. The differential relief valve 59 will have established the position to give the proper pressure values for the load as shown in Figure 1. If a large transient impulse load is suddenly encountered none of these valves will move because of the damping effect of the choke coils on these valves. If, for instance, the table should tend to accelerate in the direction of the feed as in down cut, the oil in the back pressure lines 46 and 64 will tend to compress because the motors would then accelerate through the rack 12. This causes a rise in pressure in these lines because the fluid has nowhere to go momentarily. The reverse happens on the forward pressure lines 45 and 63. The oil in these lines tends to expand under the rapid acceleration. Therefore, the effect is two-fold: a lowering of the forward pressure momentarily and a rise in the back pressure momentarily, which in the system shown is sufficient to minimize movement to a very small value, thus effecting substantially smooth table operation.

With the motors working under load during an up-cut milling operation, a sudden rise in work resistance will react to increase the pressure in the supply lines 45, 45a—63, and decrease that in lines 64a—46a, increasing the pressure drop across the motor M2 so that this motor will exert more driving power to overcome the increase in load. Thus, during up-cut milling, as the load on motor M1 increases, the motor M2 is caused to tender greater and greater assistance to the motor M1 in overcoming the increased resistance.

In down-cut milling, the cutting force may be sufficient to act as the driving power for the table and the motors function to hold back the table. With the locked circuit as explained, the pressure in line 46 of the fluid discharging from the motor M1 will be higher than the pressure in line 45. A similar effect would be produced in the lines 63a and 64a of motor M2, the pressure in line 64a being higher than the pressure in line 63a.

The purpose of the fluid resistances or choke coils 78 and 94, and 83 and 86 associated with the respective variable resistance valves R1 and R2, is to restrict too rapid a response and excessive hunting of the valve plungers 80 and 88 during the operation of the device to thereby provide a smooth even control for the work table.

The line 63a is connected to the short circuiting valve 65 which at this time connects fluid from the line 63a through the annular groove 77 of its plunger 66 to the line 63 connected to the port of the motor M2; this port being an inlet port, when feeding in the direction 28 to the left. Discharge from the port 18 of the motor M2 at this time passes through the line 64 and the annular groove 84 of the valve plunger 66 into the line 64a and through a resistance 86 connected to the pressure chamber 87 of the two-way resistance valve R2. As the pressure builds up in the chamber 87 the plunger 88 of the valve R2 is moved axially compressing the spring 82 so as to connect line 64a to the line 46a which in turn is connected to the line 46 and the port 16 of the motor M1.

At the conclusion of the feeding motion in the direction 28 the lever 38 of the selector valve is moved to rapid traverse position 38e for return rapid traverse movement to the direction 32. As described, rapid traverse pressure from line 36 is then connected to the port 16 of the motor M1 while the motor M2 is short circuited by the valve 65 for free rotation during rapid movement of the table T.

Feed in the direction 32 may then be effected by positioning the control lever 38 of the selector valve 37 in the feed right position 38d. Feeding pressure will then be applied at the port 16 of the motor M1, while lower pressure will be returned from the port 15 back to the variable delivery pump 14. Under these conditions pressure will be transmitted out through the line 46a from the line 46 through resistance 83 to the pressure chamber 92 of the valve R2 which will cause the plunger 88 to shift axially, compressing spring 93 and opening line 46a to communication with line 64a to cause a pressure drop in line 64a with respect to line 46a. Fluid may then pass through the annular groove 84 of the plunger 66 of the short circuiting valve 65 into the line 64 and thus into the port 18 of the motor M2. Discharge from port 17 of this motor then passes out through the line 63, annular groove 77 of the valve plunger 66 to the line 63a, then through the resistance 94 into the pressure chamber 89 of the valve R1 to move the plunger 80 against the compression spring 90 to connect the line 63a with the line 45a causing a pressure drop in line 45a with respect to line 63a. The line 45a is connected to the line 45 and the port 15 associated with the motor M1. Thus the two-way resistance valves R1 and R2 are arranged to automatically function for either direction of feeding movement to provide the desired pressure drop as shown in Figure 1, between the ports 15 and 17, and 18 and 16 of the motors M1 and M2 by the relative position of their central plunger spools 45b and 46b with respect to the ports 45c and 46c, the plunger being actuated by pressure changes created in the lines connected to the ports of the motors M1 and M2 by the reaction of work and cutter. The various pressures resulting during the feeding motion in either direction has already been described in connection with Figure 1 except that when feeding to the right the pressures P1 and P2 would be opposite to those of B1 and B2 in the diagram, Figure 1.

When it is desired to effect a relatively high rate of feed for the work table, the control lever 71 of the feed range valve 70 is moved to the high position 71b so that high pressure from the feed supply line 49 is transmitted through the line 95 and the annular groove 72 of the plunger 73 to the line 69 to thus provide a high pressure in the chamber 68 of the short circuiting valve 65 sufficient to cause the plunger 66 to compress the spring 67 and interconnect the lines 63 and 64 of the motor through annular groove 77 to thereby allow free rotation of the motor M2 during movement of the work table at rapid or high rates of feed.

What is claimed is:

1. In a machine tool having a movable member subject to variable resistance forces tending to modify the movement of said member, an actuating device for maintaining uniform movement in said member comprising, a pair of hydraulic motors mechanically connected to drive said member, a fluid pressure pump, a hydraulic impelling pressure circuit including conduit means interconnecting said pump and one of said motors, a return pressure conduit for said motor and means for connecting the other of said motors to the hydraulic impelling pressure circuit and the return pressure conduit in parallel with said first motor through a pair of fluid resistances.

2. In a machine tool having an actuable member movable relative to a cutting tool, an actuator for said member including the combination of a pair of hydraulic motors, each mechanically connected to drive said member, a fluid pressure pump, a locked hydraulic feeding circuit interconnected between said pump and the intake and exhaust ports of one of said motors, and means coupling each of said ports of the one motor through fluid resistances to corresponding ports of said other motor.

3. In a machine tool actuating mechanism for a movable machine member, a first hydraulic motor connected to actuate said member in a selected direction, a fluid pressure pump, a locked hydraulic feeding circuit interconnecting said pump and the intake and exhaust ports of said motor, a second hydraulic motor connected to actuate said member in the same selected direction, a fluid resistance interconnected between the intake ports of said motors and a fluid resistance interconnected between the exhaust ports of said motors whereby the pressure at the intake port of said second-mentioned motor will be lower than the pressure at the intake port of said first-mentioned motor and wherein the pressure at the exhaust port of said first-mentioned motor will be lower than the pressure at the exhaust port of said second motor.

4. In a machine tool having a work table movable relative to a cutting tool to effect a cutting operation on a work piece mounted on the table, an actuating mechanism for effecting said relative movement comprising a main fluid pressure motor mechanically connected to drive said work table, a fluid pressure pump connected by a locked hydraulic feeding circuit to the intake and exhaust ports of said motor, whereby the cutting action between work piece and cutter tends to retard or accelerate said motor to effect complementary pressure rise and fall between the ports of said motor, a second fluid pressure motor mechanically connected in driving relationship with said first-mentioned motor and said table, and means for connecting the inlet and exhaust ports of said second-mentioned motor through a fluid resistance to the corresponding ports of said main motor whereby changes in pressure at the ports of said main motor changes the torque characteristics of said second-mentioned motor to neutralize variations in said table movement in response to work resistance changes taking place between the work piece and cutter.

5. In a milling machine having a relatively movable work table and a cutting tool adapted to effect a cutting operation on a work piece on said work table, an actuating device for effecting said relative movement including the combination of a main fluid pressure motor mechanically connected to said table, a fluid pressure pump connected by means of a locked hydraulic circuit to said motor, and a second fluid pressure motor mechanically connected to said table and hydraulically connected in parallel with said first-mentioned motor through a pair of resistances respectively connected between the intake and exhaust ports of said motors whereby said second-mentioned motor neutralizes irregular movements in said work table.

6. In a machine tool having a work table movable relative to a rotary cutting tool and an actuating means for said table effective for either direction of feed of said table and rotation of said cutter to effect uniform feeding movements in said table, the combination of a pair of hydraulic motors, mechanical driving means interconnecting said motors and said table, a fluid pressure pump, a locked hydraulic feeding circuit interconnecting said pump with both of said motors to effect feeding motions in said table, resistance means connected across the intake ports and across the exhaust ports of the respective motors whereby said second-mentioned motor may be also actuated at reduced pressure from said fluid pressure pump, said mechanical driving means synchronizing said motors to cause both of said motors to apply a driving force or a retarding force to said table to automatically neutralize the effect of variation in cutting forces applied to said table by action of said tool on a work piece on said work table.

7. In a milling machine hydraulic feed transmission adapted to actuate a work table, a hydraulic motor, a mechanical drive connecting said motor to said table, a fluid pressure feeding pump, a locked hydraulic circuit interconnecting said pump with said motor, a second hydraulic motor, mechanical driving means connecting said motor to said first-mentioned motor and to said table, adjustable fluid resistances connected between the intake and exhaust ports of said motors, and means operated by fluid pressure changes in said locked hydraulic feeding circuit for adjusting said resistances to vary the torque characteristics of said second-mentioned motor to automatically compensate for changes in work resistance applied to said table.

8. In a hydraulic table feeding transmission, a hydraulic motor connected to actuate said table, a source of rapid traverse fluid pressure connectable to said motor, a source of feeding pressure connectable to said motor, a selector valve for operatively connecting one or the other of said sources to said motor, means for changing the rate of feed to said hydraulic motor, a backlash control motor hydraulically interconnected through resistance means with said first-mentioned motor effective during low feed ranges to restrict movement of said work table, a control valve associated with said backlash motor operable to short circuit said motor to render it ineffective to restrict movement of said table when operating in high feed ranges, and means, operable by the positioning of said selector valve to effect rapid traverse actuation of said first-mentioned motor to operate said control valve to render said second-mentioned motor ineffective to restrict movement of said work table.

9. In a hydraulic mechanism, a work table, a first hydraulic motor mechanically connected to drive said work table, a variable delivery high pressure feed pump including means adjustable for effecting high and low feed ranges, a locked hydraulic feeding circuit interconnecting said pump and said first motor, a rapid traverse supply pump for said circuit for actuating said motor in rapid traverse movements, a selector valve operable to render said feed or rapid traverse pumps effective to actuate said motor, a second motor hydraulically connected through resistance means across the ports of said first motor, a feed range selector valve operable to a low or high range position and effective when in said high range position to cause said second motor to be rendered ineffective.

10. In a hydraulic mechanism, a work table, a first hydraulic motor mechanically connected to drive said work table, a variable delivery high pressure feed pump adjustable for high and low feed ranges, a hydraulic feeding circuit interconnecting said pump and said first motor, a rapid traverse supply pump for said circuit for actuating said motor in rapid traverse movements, a selector valve operable to render said feed or rapid traverse pumps effective to actuate said motor, a second motor hydraulically shunted through resistance means across the ports of said first motor, fluid pressure control means including a feed range selector valve operable to a low or high range position effective when in said high range position to cause said second motor to be rendered inoperative, and means whereby the positioning of said selector valve to operatively connect said rapid traverse pump to said first motor automatically actuates said fluid pressure control means to render said second-mentioned motor ineffective to restrict motion in said table.

11. In a hydraulic feed transmission for a work table, a main hydraulic feed motor mechanically connected to drive said table, a hydraulic feeding circuit associated with said motor including means for applying a variable feeding volume and a rapid traverse volume to said motor, a selector valve in said circuit for rendering said feed or rapid traverse volumes operative on said motor, a second motor mechanically connected in driving relationship with said table and said first-mentioned motor, a fluid pressure control circuit including resistance means interconnected with said circuit effective to cause said second-mentioned motor to apply variable forces to said table in accordance with changes in the work resistance applied to said table, fluid flow control means for rendering said second motor ineffective when high rates of feeding are being effected in said first-mentioned motor, and further control means operable by the movement of said selector valve to operatively connect said rapid traverse volume to said first-mentioned motor to automatically render said second-mentioned motor ineffective.

12. A hydraulic feeding mechanism for a machine tool member, comprising a pair of hydraulic motors having their intake ports interconnected through a fluid resistance and their exhaust ports interconnected through another fluid resistance, a fluid pressure pump having its intake and exhaust ports directly connected respectively to the exhaust and intake ports of one of said motors and by way of the fluid resistances to the respective ports of the other motor, and a common mechanical driving connection between said member and both of said motors.

13. In a milling machine hydraulic feeding mechanism for actuating a work table, the combination of a pair of hydraulic motors connected through a common mechanical driving connection to said work table, a source of fluid pressure for actuating said motors at low and high feed rates and at a rapid traverse rate, control means for rendering said rates selectively effective, means for automatically rendering one of said motors inoperative when high feed rates are being effected in the work table, and further means for automatically rendering said one motor inoperative when said table is operating at a rapid traverse rate.

14. In a hydraulic feeding mechanism for a milling machine work table, the combination of a main hydraulic actuating motor, a hydraulic backlash control motor, mechanical driving means interconnecting both of said motors to said work table, a fluid pressure circuit connected to said first motor, a source of rapid traverse pressure and a source of variable feeding pressure, selector valve means for connecting one or the other of said sources of pressure to said circuit, a control circuit associated with said second motor, and control valve means in said circuit operable from said source of rapid traverse pressure to render said backlash control motor inoperative when rapid traverse pressure is applied to said main actuating motor.

15. In a hydraulic feeding mechanism for a milling machine work table, the combination of a main hydraulic actuating motor, a hydraulic backlash control motor, common mechanical driving means interconnecting both of said motors to said work table, a fluid pressure circuit connected to said first motor, a source of rapid traverse pressure and a source of variable feeding pressure, selector valve means for connecting one or the other of said sources of pressure to said circuit, a control circuit associated with said second motor, control valve means in said circuit operable from said source of rapid traverse pressure to render said backlash control motor inoperative when rapid traverse pressure is applied to said main actuating motor, and manually actuable control valve means operable in accordance with the rate of feed to be effected in said first-mentioned motor to automatically operate said first-mentioned control valve means for said second-mentioned motor to render said second motor inoperative when high feeding rates are being effected in said work table.

16. In a hydraulic transmission organization for actuating a milling machine work table, the combination of a source of rapid traverse pressure, a source of low and high feed pressure, an actuating motor, a hydraulic circuit connected to said motor and to said sources of pressure, control valve means in said circuit for selectively applying one or the other of said sources of pressure to said actuating motor, a second motor mechanically connected to said first-mentioned motor and to said work table, a control circuit associated with said second motor and interconnected through resistance means to said circuit associated with said actuating motor, control valve means in said control circuit automatically operable by the source of rapid traverse pressure during rapid traverse movement of said work table to render said second motor inoperative and selector valve control means in said control circuit for transferring control of said control valve means from the source of rapid traverse pressure to the source of feeding pressure whereby said second-mentioned motor is automatically rendered inoperative during relatively high rates of feeding motion of said work table.

HANS ERNST.
ALBERT H. DALL.

REFERENCES CITED

The following references are of record in the file of this patent:

UNITED STATES PATENTS

| Number | Name | Date |
|---|---|---|
| 2,236,256 | Allard | Mar. 25, 1941 |
| 2,309,637 | Fickett et al. | Feb. 2, 1943 |
| 2,493,512 | Vickers | Jan. 3, 1950 |